US010291839B2

(12) United States Patent
Kato

(10) Patent No.: US 10,291,839 B2
(45) Date of Patent: May 14, 2019

(54) IMAGE CAPTURING APPARATUS AND METHOD OF CONTROLLING THE SAME

(71) Applicant: CANON KABUSHIKI KAISHA, Tokyo (JP)

(72) Inventor: Ayumi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 15/602,386

(22) Filed: May 23, 2017

(65) Prior Publication Data

US 2017/0353654 A1    Dec. 7, 2017

(30) Foreign Application Priority Data

Jun. 1, 2016 (JP) .................................. 2016-110217

(51) Int. Cl.
| | | |
|---|---|---|
| H04N 5/232 | (2006.01) | |
| G06T 7/73 | (2017.01) | |
| G06T 7/50 | (2017.01) | |
| G06T 7/246 | (2017.01) | |

(52) U.S. Cl.
CPC ......... *H04N 5/23212* (2013.01); *G06T 7/248* (2017.01); *G06T 7/50* (2017.01); *G06T 7/74* (2017.01); *H04N 5/23258* (2013.01); *B60Y 2400/3015* (2013.01); *B60Y 2400/92* (2013.01)

(58) Field of Classification Search
None
See application file for complete search history.

(56) References Cited

U.S. PATENT DOCUMENTS

| | | | |
|---|---|---|---|
| 6,898,692 B1 * | 5/2005 | Cameron | ............... G06T 15/405 |
| | | | 710/52 |
| 7,421,195 B2 | 9/2008 | Furuki | |
| 9,167,148 B2 | 10/2015 | Onuki et al. | |
| 2008/0089557 A1 | 4/2008 | Iwaki et al. | |
| 2012/0102023 A1 * | 4/2012 | Osman | ................. G11B 27/036 |
| | | | 707/722 |
| 2017/0178352 A1 * | 6/2017 | Harmsen | ................. G06T 7/579 |

FOREIGN PATENT DOCUMENTS

| | | |
|---|---|---|
| JP | 2006-003803 A | 1/2006 |
| JP | 2006-322795 A | 11/2006 |
| JP | 2013-186201 A | 9/2013 |

* cited by examiner

*Primary Examiner* — Eileen M Adams
(74) *Attorney, Agent, or Firm* — Venable LLP

(57) ABSTRACT

An image capturing apparatus comprises an image capturing unit, a moving object detection unit, a depth information detection unit configured to detect a plurality of depth information corresponding to each of the plurality of detection regions, a storage control unit configured to store the plurality of depth information as map data in a storage unit. The depth information detection unit detects a second depth information in a second detection region including at least one of regions in which the moving object is detected, and the storage control unit updates only the second depth information detected by the depth information detection unit with respect to the map data stored in the storage unit.

13 Claims, 5 Drawing Sheets

FIG. 3A1
DISTANCE MAP FOR THIRD LATEST FRAME
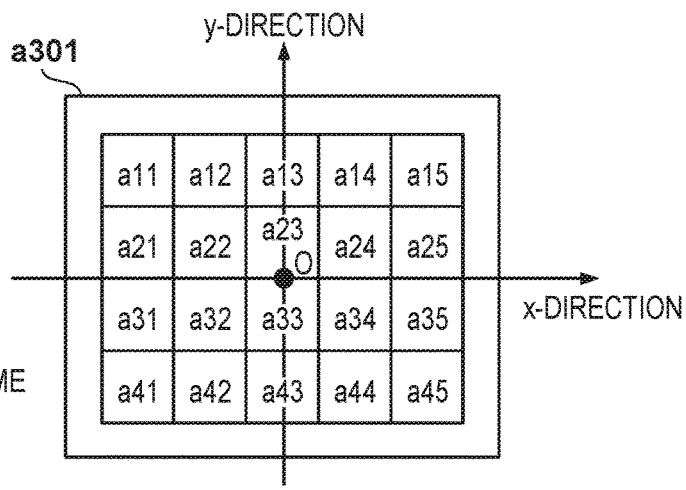
FIG. 3A2
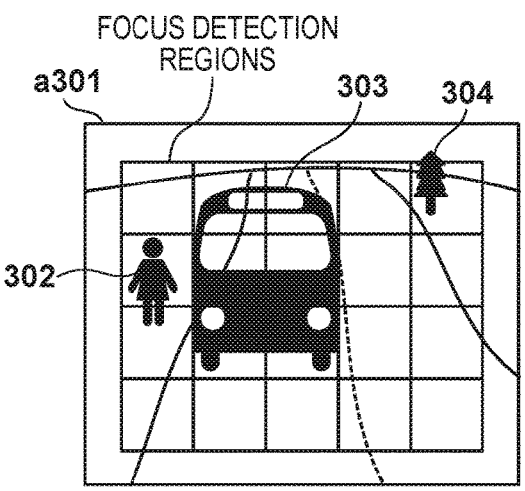
FIG. 3A3
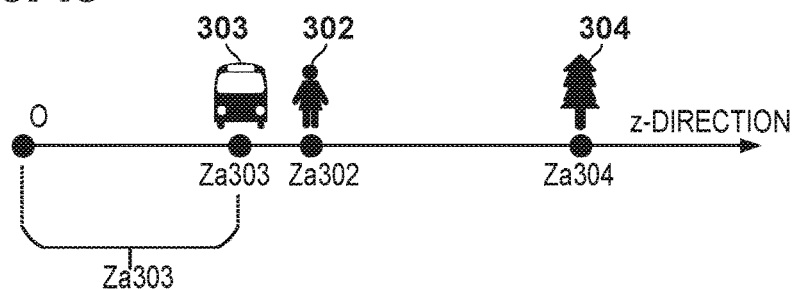

FIG. 3B1
DISTANCE MAP
FOR SECOND LATEST FRAME
FIG. 3B2
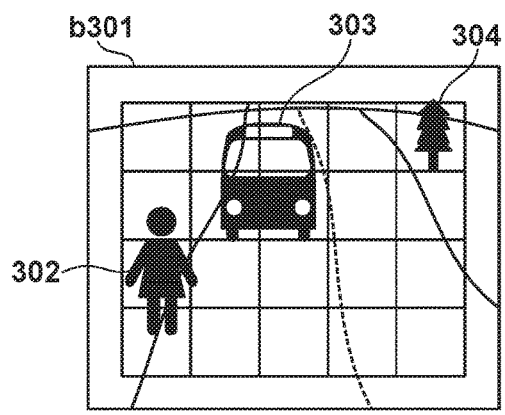
FIG. 3B3
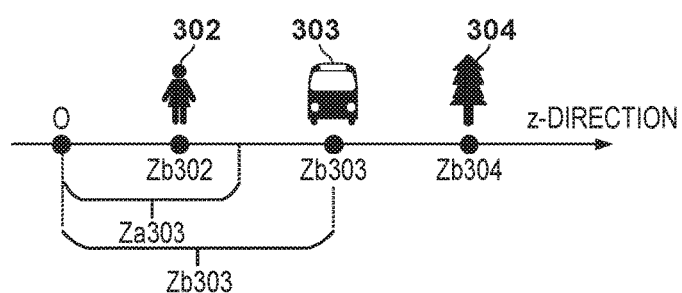

FIG. 3C1
DISTANCE MAP FOR LATEST FRAME
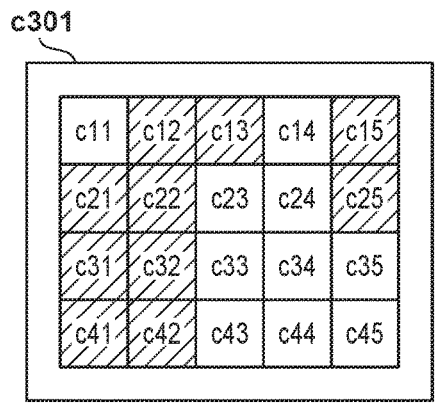
FIG. 3C2
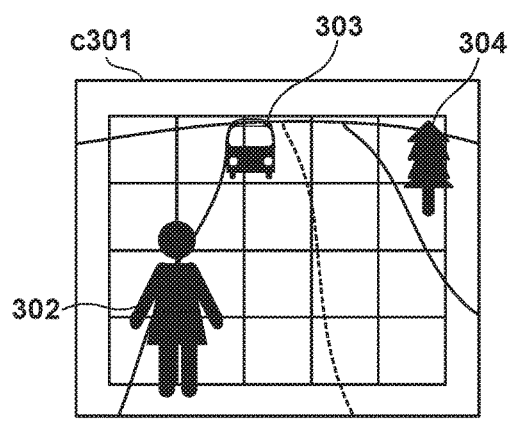
FIG. 3C3
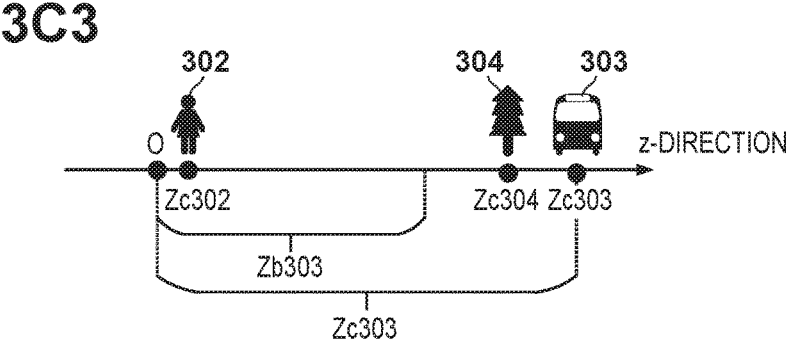

IMAGE CAPTURING APPARATUS AND METHOD OF CONTROLLING THE SAME

BACKGROUND OF THE INVENTION

Field of the Invention

The present invention relates to a technique for acquiring depth information of objects from a captured image.

Description of the Related Art

Conventionally, an image capturing apparatus is known that can acquire information corresponding to the depths of objects in a captured image (e.g., distance information). The distance information acquired from the image is updated as needed on the assumption that a desired object and the image capturing apparatus move, or updated when a movement is detected. Such an image capturing apparatus may be an onboard camera mounted on a vehicle, for example, an automobile, and used for the purpose of acquiring distance information indicating a distance to a desired object, such as a leading vehicle travelling in front of a self-vehicle, using a captured image of the leading vehicle.

An image capturing apparatus acquires distance information of objects as follows: a plurality of focus detection regions are set in a captured image for calculation of distance information, and for each focus detection region, distance information indicating a distance between a desired object present in the focus detection region and the image capturing apparatus is calculated. At this time, a limited number of focus detection regions can be set to reduce a calculation load; this enables acquisition of distance information of objects at higher speed (Japanese Patent Laid-Open No. 2006-322795).

However, according to Japanese Patent Laid-Open No. 2006-322795 mentioned above, in updating distance information acquired through selection of a part of focus detection regions that includes an object detected as a moving object, the order of priority of calculation is not particularly determined for the focus detection regions. Therefore, calculation of distance information may take time in a focus detection region including, for example, a rapidly approaching object (e.g., a person or a vehicle), even though such a focus detection region should be prioritized over other focus detection regions in calculation of distance information.

SUMMARY OF THE INVENTION

The present invention has been made in consideration of the aforementioned problems, and realizes a technique that enables high-speed acquisition and update of depth information of moving objects in accordance with the statuses of movements of the moving objects.

In order to solve the aforementioned problems, the present invention provides an image capturing apparatus comprising: an image capturing unit; a moving object detection unit configured to detect, among the objects using the image acquired by the image capturing unit, moving objects moving relative to the image capturing apparatus; a depth information detection unit configured to set a plurality of first detection regions in the image acquired by the image capturing unit, and detect a plurality of depth information corresponding to each of the plurality of first detection regions; a storage control unit configured to store the plurality of depth information as map data in a storage unit; and a moving object information acquisition unit configured to acquire moving object information based on the map data, the moving object information indicating relative positional relationships between the moving objects detected by the moving object detection unit and the image capturing apparatus, wherein the depth information detection unit detects a second depth information in a second detection region including at least one of regions in which the moving object is detected based on the result of the moving object detection by the moving object detection unit, and the storage control unit updates only the second depth information detected by the depth information detection unit with respect to the map data stored in the storage unit.

In order to solve the aforementioned problems, the present invention provides a control method of an image capturing apparatus which has an image capturing unit, a moving object detection unit configured to detect, among the objects using the image acquired by the image capturing unit, moving objects moving relative to the image capturing apparatus, a depth information detection unit configured to set a plurality of first detection regions in the image acquired by the image capturing unit, and detect a plurality of depth information corresponding to each of the plurality of first detection regions, and a storage control unit configured to store the plurality of depth information as map data in a storage unit, the method comprising: acquiring moving object information based on the map data, the moving object information indicating relative positional relationships between the moving objects detected by the moving object detection unit and the image capturing apparatus; detecting a second depth information in a second detection region including at least one of regions in which the moving object is detected based on the result of the moving object detection by the moving object detection unit; and updating only the second depth information detected by the depth information detection unit with respect to the map data stored in the storage unit.

In order to solve the aforementioned problems, the present invention provides a computer-readable storage medium storing a program for causing a computer to execute a control method of an image capturing apparatus which has an image capturing unit, a moving object detection unit configured to detect, among the objects using the image acquired by the image capturing unit, moving objects moving relative to the image capturing apparatus, a depth information detection unit configured to set a plurality of first detection regions in the image acquired by the image capturing unit, and detect a plurality of depth information corresponding to each of the plurality of first detection regions, and a storage control unit configured to store the plurality of depth information as map data in a storage unit, the method comprising: acquiring moving object information based on the map data, the moving object information indicating relative positional relationships between the moving objects detected by the moving object detection unit and the image capturing apparatus; detecting a second depth information in a second detection region including at least one of regions in which the moving object is detected based on the result of the moving object detection by the moving object detection unit; and updating only the second depth information detected by the depth information detection unit with respect to the map data stored in the storage unit.

According to the present invention, depth information of moving objects can be acquired and updated at high speed in accordance with the statuses of movements of the moving objects.

Further features of the present invention will become apparent from the following description of an exemplary embodiment (with reference to the attached drawings).

BRIEF DESCRIPTION OF THE DRAWINGS

FIGS. 3A1 to 3C3 show examples of distance maps acquired from images captured by the image capturing apparatus according to the embodiment.

DESCRIPTION OF THE EMBODIMENTS

Figure 1:
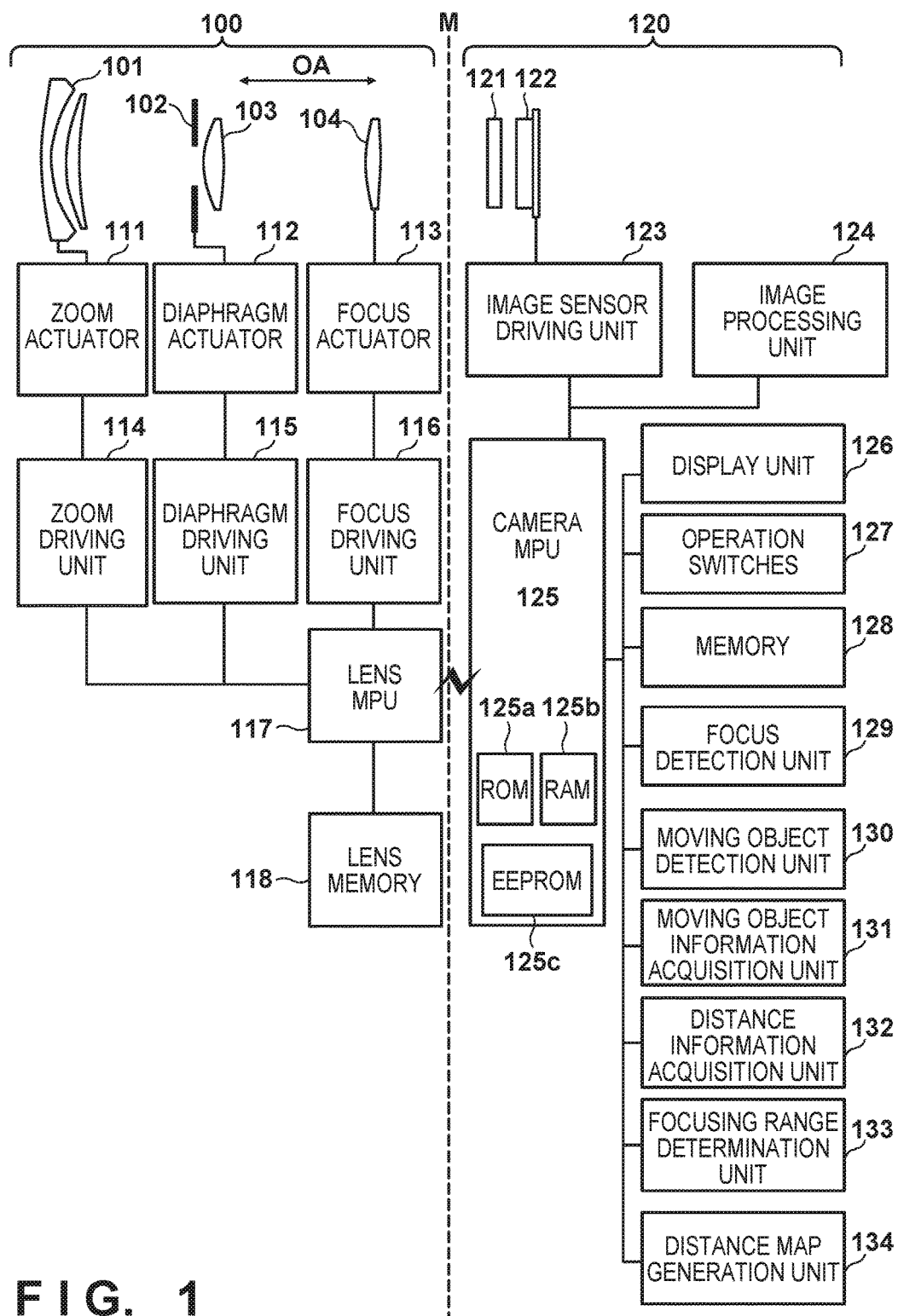
FIG. 1 is a block diagram showing a configuration of an image capturing apparatus according to an embodiment.

An embodiment of the present invention will be described in detail below. The following embodiment is merely an example for practicing the present invention. The embodiment should be properly modified or changed depending on various conditions and the structure of an apparatus to which the present invention is applied. The present invention should not be limited to the following embodiment. Also, parts of the embodiment to be described later may be properly combined.

The present embodiment is applicable to various image capturing apparatuses, including a digital still camera, a digital video camera, an onboard camera, and an image capturing apparatus installed in a mobile telephone, a smartphone, and so forth.

The present embodiment describes an example in which an image capturing apparatus installed as an onboard camera acquires distance information as depth information of objects in a captured image, and updates distance map data.

In the present invention, information corresponding to depths of objects in an image can be embodied in various ways. Specifically, information represented by data corresponding to depths of objects (depth information) may directly indicate object distances from an image capturing apparatus to the objects in an image, or may indicate relative relationships between the object distances and depths of the objects in the image. The present embodiment describes an example in which a defocus map is generated from defocus amounts acquired by performing focus detection based on a Depth from Defocus (DFD) technique. The defocus amounts are converted into object distances based on conditions related to an optical system and an image sensor; as a result, distance map data indicating a distribution of object distances is acquired.

<Apparatus Configuration>

First, a configuration and functions of a digital camera according to the present embodiment will be described with reference to FIG. 1.

An image capturing apparatus (hereinafter, "camera") according to the present embodiment is a digital single-lens reflex camera with an interchangeable lens, and includes a lens unit 100 and a camera body 120. The lens unit 100 is detachably connected to the camera body 120 via a mount M represented by a dot line shown at the center of the figure.

The lens unit 100, which forms an object image, includes a first lens assembly 101, a diaphragm 102, a second lens assembly 103, a focusing lens assembly (hereinafter, "focusing lens") 104, and a later-described control unit. The lens unit 100 functions as an imaging optical system that includes the focusing lens 104 and forms an optical image of an object.

The first lens assembly 101 is placed at a tip of the lens unit 100, and held in such a manner that it can advance and recede in a direction of arrow OA extending along an optical axis (hereinafter, "optical axis direction"). Hereinafter, the optical axis direction OA may be referred to as a z-direction, and a direction of viewing objects from the camera will be regarded as a positive direction. In the present embodiment, it will be assumed that the origin 0 of an axis of the z-direction corresponds to a position of a later-described image sensor 122 included in the camera body 120.

The diaphragm 102 adjusts a light amount at the time of shooting by adjusting its aperture diameter. The diaphragm 102 and the second lens assembly 103 can advance and recede integrally in the optical axis direction OA.

The focusing lens 104 performs focus detection by advancing and receding in the optical axis direction OA. In the present embodiment, among positions of the opposite ends of a maximum range in which the focusing lens 104 can move, a position of the focusing lens 104 on the infinity side will be referred to as a far end, and a position of the focusing lens 104 on the near side will be referred to as a near end.

The control unit of the lens unit 100 includes a zoom actuator 111, a diaphragm actuator 112, a focus actuator 113, a zoom driving unit 114, a diaphragm driving unit 115, and a focus driving unit 116 as driving units. It also includes a lens MPU 117 and a lens memory 118 as units that control the driving units.

The zoom actuator 111 performs a zoom operation by causing the first lens assembly 101 and the third lens assembly 103 to advance and recede in the optical axis direction OA. The diaphragm actuator 112 adjusts a light amount for shooting by controlling the aperture diameter of the diaphragm 102, and controls an exposure period at the time of shooting. The focus actuator 113 performs focus detection by causing the focusing lens 104 to advance and recede in the optical axis direction OA, and has a function of detecting a current position of the focusing lens 104.

The zoom driving unit 114 drives the zoom actuator 111 in accordance with a zoom operation performed by a photographer or a control value of the lens MPU 117. The diaphragm driving unit 115 controls the aperture of the diaphragm 102 by driving the diaphragm actuator 112. The focus driving unit 116 performs focus detection by causing the focusing lens 104 to advance and recede in the optical axis direction OA through driving of the focus actuator 113 based on the results of focus detection.

The lens MPU 117 controls the zoom driving unit 114, diaphragm driving unit 115, focus driving unit 116, and lens memory 118 by performing all of calculation and control related to the imaging optical system. The lens MPU 117 also detects current lens positions, and gives notice of lens position information in response to a request from a camera MPU 125. Various types of optical information necessary for automatic focus detection are stored in the lens memory 118. For example, correspondence relationships between driving amounts of the focusing lens 104 and defocus amounts are stored in the lens memory 118. Thus, upon receiving a request to change a defocus amount by a predetermined amount from the camera MPU 125, the lens MPU 117 can control the focus actuator 113 to move the focusing lens 104 by a distance corresponding to a predetermined defocus amount with reference to the correspondence relationships stored in the lens memory 118.

The camera body 120 includes an optical low-pass filter 121, the image sensor 122, and a later-described control unit. The optical low-pass filter 121 is an optical element which reduces false color and moire occurred in a captured image at a stage of a light beam.

The image sensor 122 is composed of, for example, a CMOS image sensor and its peripheral circuits, and generates electric signal (analog signal) by receiving the optical image formed by the imaging optical system and performing photoelectric conversion for the optical image. The CMOS image sensor includes light-receiving pixels, each of which is provided with a photoelectric converter and serves as a unit pixel; a plurality of unit pixels are arranged two-dimensionally, forming a pixel group (an imaging plane). The image sensor 122 can output a signal from the pixel group on a pixel-by-pixel basis. In other words, the image sensor 122 includes a plurality of imaging pixels that divide and receive a light beam passing through the exit pupil of the imaging optical system, which forms an object image, and generate image signals of the object on a pixel-by-pixel basis.

The control unit of the camera body 120 includes an image sensor driving unit 123, an image processing unit 124, the camera MPU 125 that controls the entirety of the camera body 120, a display unit 126, operation switches 127, a memory 128, a focus detection unit 129, a moving object detection unit 130, a moving object information acquisition unit 131, a distance information acquisition unit 132, a focusing range determination unit 133, and a distance map generation unit 134. The image sensor driving unit 123 controls a charge accumulation operation of the image sensor 122 and transmits digital signals (image signals) which are converted from the electric signal by analog-to-digital conversion of the image sensor 122, to the camera MPU 125. The image processing unit 124 applies various types of image processing, such as gamma conversion, color interpolation, and JPEG compression, to the image signals read out from the image sensor 122 and generates image data (hereinafter "image") comprised of the digital signals.

The camera MPU 125 includes a microprocessor, and performs all of calculation and control related to the camera body 120. That is, it controls the image sensor driving unit 123, image processing unit 124, display unit 126, operation switches 127, memory 128, focus detection unit 129, moving object detection unit 130, distance information acquisition unit 132, focusing range determination unit 133, and distance map generation unit 134. The camera MPU 125 is connected to the lens MPU 117 via signal lines provided in the mount M. Accordingly, the following requests can be issued to the lens MPU 117: a request to acquire lens positions; a request for zoom driving, diaphragm driving, and lens driving by a predetermined driving amount; and a request to acquire optical information specific to the lens unit 100.

A ROM 125a storing a program for controlling camera operations, a RAM 125b storing variables, and an EEPROM 125c storing various parameters are built in the camera MPU 125. The camera MPU 125 executes focus detection processing according to the present embodiment by reading out the program stored in the ROM 125a, deploying the program to the RAM 125b, and executing the program. The details of the focus detection processing will be described later.

The display unit 126 includes a liquid crystal display (LCD) panel, an organic EL display, or a similar display device, and displays various types of information related to an operation mode of the camera. Examples of the operation mode of the camera include a shooting mode for shooting still images and moving images, and a reproduction mode for reproducing images that have already been shot and stored in the memory 128. In the shooting mode, for example, information related to the shooting mode of the camera, a pre-shooting preview image, a post-shooting image for confirmation, and an in-focus image at the time of focus detection are displayed. In addition, moving images that are currently being shot are displayed successively.

The operation switches 127 include a shutter switch, a power switch, a zoom switch, a mode changeover switch, and so forth. The memory 128 is a flash memory that is attachable to and detachable from the camera, and images that have already been shot are recorded therein.

The focus detection unit 129 sets regions in image data acquired by the image processing unit 124, and performs focus detection using an automatic focus (AF) method based on blur evaluation values calculated within the regions. Specifically, it uses automatic focus (AF) based on the Depth from Defocus (DFD) technique as a focus detection method, and calculates blur evaluation values by executing calculation processing with respect to two images that differ from each other by a predetermined defocus amount. Note that blur evaluation values according to the present embodiment indicate a blurred state of a captured image, and are correlated with a variance of a point spread function for the imaging optical system. The point spread function indicates a degree of spreading of a point image after the point image has passed through the lenses. The variance of the point spread function for the imaging optical system is also correlated with defocus amounts. In view of the above, it is apparent that blur evaluation values are correlated with defocus amounts. This correlation will be referred to as a blur evaluation value-defocus amount correlation.

The focus detection unit 129 performs AF based on the DFD technique using two images that differ from each other by a predetermined defocus amount; to acquire these two images, shooting is performed while changing shooting parameters that influence a blurred state of a captured image, such as a focusing lens position, an f-number, and a focal length, under control of the camera MPU 125. In changing the shooting parameters, any value may be changed as long as one or more parameters are changed. In the present embodiment, two images that differ from each other by a predetermined defocus amount are acquired by changing a focusing lens position.

The moving object detection unit 130 detects objects by applying signal processing to image data acquired by the image processing unit 124, and also detects, among objects in an image, moving objects that are moving relative to the camera. The details will be described later.

A gyroscope may be installed for the purpose of detecting moving objects. This enables detection of a movement of the camera itself, and enables detection of moving objects by subtracting the movement of the camera itself from movements in an image. When the camera is mounted on a vehicle as in the present embodiment, the results of detection by a gyroscope that is already installed as one of the functions of the vehicle may be used, instead of providing the camera with a gyroscope.

With respect to moving objects detected by the moving object detection unit 130, the moving object information acquisition unit 131 acquires moving object information that includes, for example, distances to the camera and speeds relative to the camera. The details will be described later.

A gyroscope may be installed in the camera according to the present embodiment for the purpose of acquiring the moving object information. When the camera is mounted on a vehicle as in the present embodiment, the results of detection by a gyroscope that is already installed as one of the functions of the vehicle may be used, instead of providing the camera with a gyroscope. Other methods may also be used, one example being a method of detecting a speed using the number of revolutions or the angle of vehicle wheels. That is, the present embodiment is based on the premise that a moving speed of the camera is detectable.

The distance information acquisition unit 132 calculates distance information of objects based on the results of focus detection by the focus detection unit 129. The details will be described later.

The focusing range determination unit 133 determines a focusing range in which the focusing lens is driven based on the moving object information indicating relative positional relationships between moving objects detected by the moving object detection unit 130 and the camera. The details will be described later.

Based on distance information acquired by the distance information acquisition unit 132, the distance map generation unit 134 generates distance map data, and updates a part of distance information in a distance map that has already been generated. Note that a captured image is divided into a plurality of regions, and distance information indicating a distance to an object is acquired on a region-by-region basis; a set of pieces of distance information thus acquired forms a distance map.

<Updating of Distance Map>

Figure 2:
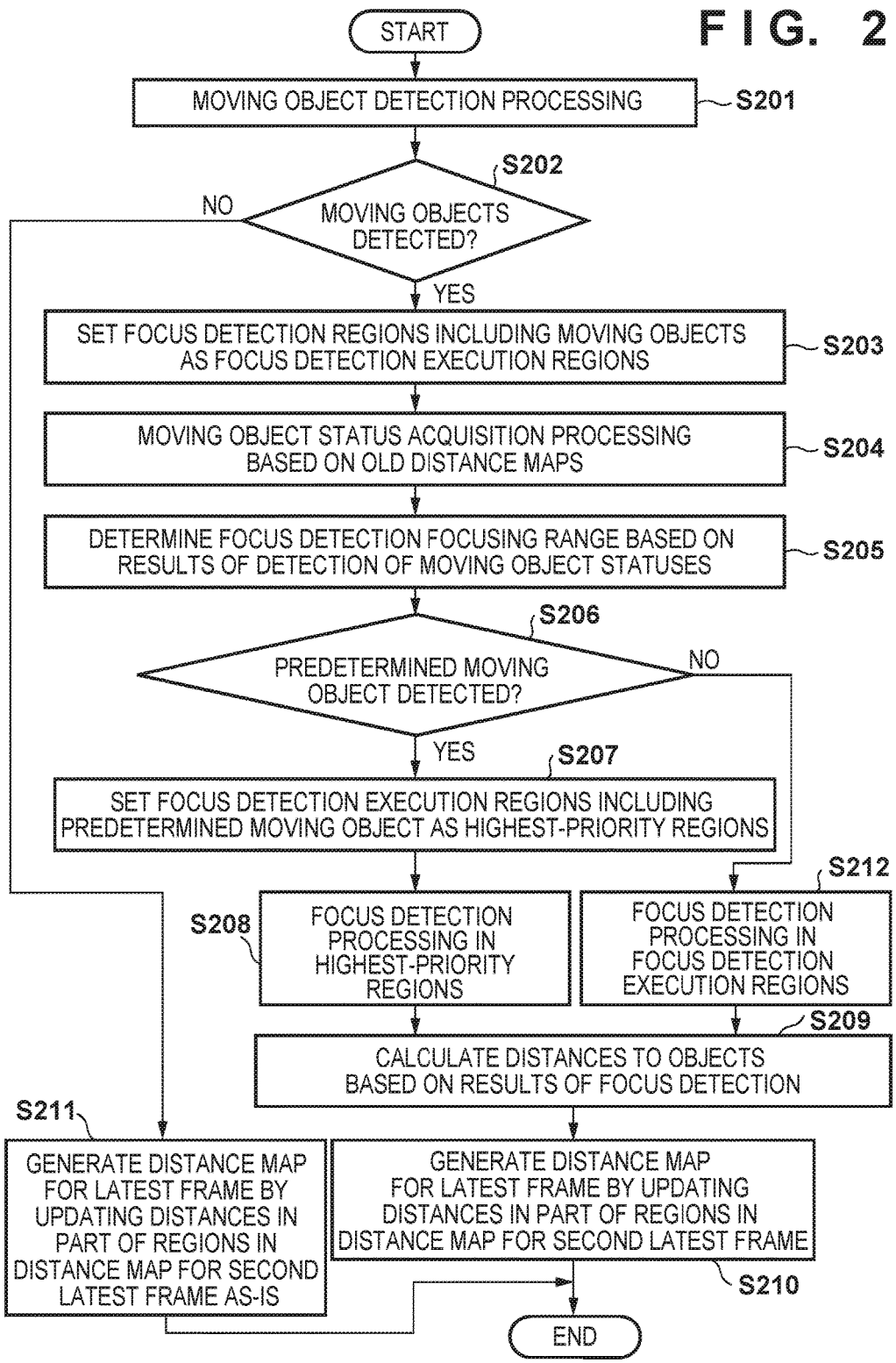
FIG. 2 is a flowchart showing processes executed by the image capturing apparatus according to the embodiment to update a distance map.

With reference to FIG. 2, the following describes processes executed by the digital camera according to the present embodiment to update a distance map. Note that the processing of FIG. 2 is implemented as the program stored in the ROM 125a is read out, deployed to the RAM 125b, and executed by the camera MPU 125, and the execution of this processing takes place when the operation mode of the camera is the shooting mode.

A description is now given of an operation state before the processing of FIG. 2 is started. Before starting the processing of FIG. 2, the camera has already started a shooting operation. The shooting operation corresponds to an operation of storing, to the RAM 125b, continuous frames of still image data or moving image data acquired by the image sensor 122 through exposure. Captured moving images are displayed successively on the display unit 126 (display of through-the-lens images). Frames mentioned here correspond to image data captured in response to an exposure start instruction issued by the camera MPU 125 to the image sensor 122. Hereinafter, the most recent frame among moving images captured before the execution of the present processing will be referred to as the latest frame.

Furthermore, it will be assumed that before starting the processing of FIG. 2, the camera has already stored at least three images (three frames in the case of moving images) to the RAM 125b. Hereinafter, the at least three images that are already stored will be referred to as the latest frame, the second latest frame, and the third latest frame, respectively, in chronological order from the newest to the oldest.

With respect to the second latest frame and the third latest frame, the focus detection unit 129 has already set a plurality of focus detection regions, and the focus detection unit 129 has already executed focus detection in each focus detection region. Furthermore, the distance information acquisition unit 132 has already calculated distance information in each focus detection region of the second latest frame and the third latest frame.

It will be also assumed that the distance map generation unit 134 included in the camera MPU 125 has already generated distance maps corresponding to the second latest frame and the third latest frame, and stored them to the RAM 125b.

In the present embodiment, one piece of distance information stored in the RAM 125b corresponds to one unit region, that is, one focus detection region. In the present embodiment, the camera executes the focus detection processing in each individual focus detection region, and stores, to the RAM 125b, pieces of distance information calculated based on the results of focus detection as a distance map; the details of the focus detection regions will be described later.

Hereinafter, a distance map corresponding to an image of the second latest (second to the latest) frame will be referred to as a distance map for the second latest frame, and a distance map corresponding to an image of the third latest (third to the latest) frame will be referred to as a distance map for the third latest frame. Although distance maps for a total of two frames, namely the second latest frame and the third latest frame, are already stored in the RAM 125b in the present embodiment, no limitation is intended in this regard.

Similarly, hereinafter, a distance map generated in later-described steps S210 and S211 in correspondence with an image of the latest frame will be referred to as a distance map for the latest frame.

Using FIG. 2, the following describes in detail processing for generating the distance map for the latest frame by updating the distance map for the second latest frame already stored.

In FIG. 2, once the processing has been started, the moving object detection unit 130 included in the camera MPU 125 executes moving object detection processing with respect to the latest frame in step S201. In the moving object detection processing, objects that have changed in size and changed in position on a plane perpendicular to the optical axis are detected by comparison with a plurality of image frames stored in the RAM 125b. Hereinafter, objects that have changed in size and changed in position on the plane perpendicular to the optical axis are defined as moving objects. Specifically, the moving object detection processing detects moving objects through template matching by comparing the latest frame with the second latest frame. Note that the moving object detection processing is not limited to using template matching, and may be executed based on any method as long as it can detect whether moving objects exist. The moving object detection processing may be executed based on one or more of the following methods: a method using the results of detection by a gyroscope; a method using optical flow; and a method using other information, for example, colors of objects. Furthermore, using the foregoing method(s), the moving object detection processing also detects the number of moving objects included in each of the latest frame and the second latest frame, the size of each moving object, an on-screen moving direction of each moving object, a moving speed of each moving object in an x-direction in an image, a moving speed of each moving object in a y-direction in an image, and so forth. Provided that the camera is held in such a manner that one side of the image sensor 122 is parallel to the ground, a direction perpendicular to the aforementioned z-direction is defined as the x-direction. A direction perpendicular to the x-direction and the z-direction is defined as the y-direction.

In step S202, the camera MPU 125 determines whether moving objects have been detected in the processing of step S201, and proceeds to step S203 if the moving objects have been detected (YES of step S202), and to step S211 if no moving object has been detected (NO of step S202).

In step S203, the focus detection unit 129 included in the camera MPU 125 sets focus detection regions in the second latest frame and focus detection regions in the latest frame that were determined to include the moving objects in the processing of step S202 as focus detection execution regions. The focus detection execution regions are set in a later-described image 301, and indicate a range in which the focus detection unit 129 executes focus detection in later-described step S212 (second focus detection regions). Distance information of the distance map for the latest frame is calculated in later-described processing of step S210. As described above, distance information is calculated only in a part of regions on a screen of the latest frame, rather than in all of the regions; this can accelerate the calculation speed.

Focus detection regions that include no moving object in the latest frame but include a moving object in the second latest frame are set as focus detection execution regions for the following reason. For example, when a certain object moved between the second latest frame and the latest frame, a background area that was hidden behind the object in the second latest frame becomes visible in the latest frame, making it necessary to execute the focus detection processing and calculate new distance information again. It is thus necessary to set focus detection execution regions that cover both of the second latest frame showing the origin of the movement of the moving object and the latest frame showing the destination of the movement of the moving object.

In step S204, the moving object information acquisition unit 131 included in the camera MPU 125 executes moving object information acquisition processing based on the distance map for the second latest frame and the distance map for the third latest frame that are already stored in the RAM 125b. The moving object information acquisition processing acquires pieces of distance information of all moving objects detected by the moving object detection unit 130 with reference to the distance map for the second latest frame and the distance map for the third latest frame. The moving object information acquisition processing also acquires, from the pieces of distance information of the moving objects thus acquired, the speeds of the moving objects in the z-direction relative to the camera. A specific example of the moving object information acquisition processing will be described later using FIGS. 3A1 to 3C3.

Provided that the speed of a moving object in the z-direction relative to the camera between the third latest frame and the second latest frame is Vz, Vz can be calculated from the following Expression 1. Taking a certain moving object, for example, it will be assumed that Za denotes a distance to the certain moving object in the third latest frame, Zb is a distance to the certain moving object in the second latest frame, and T is a period required for one frame.

$$Vz = (Zb - Za)/T \qquad \text{Expression 1}$$

In step S205, the focusing range determination unit 133 included in the camera MPU 125 determines a focus detection focusing range. The focus detection focusing range corresponds to a range in which the focusing lens 104 is driven by the lens MPU 117 to perform later-described focus detection. A maximum range that the focus detection focusing range can take corresponds to a range from the near end to the far end of the focusing lens 104. Hereinafter, this maximum range will be referred to as the entire focusing range.

By setting the focus detection focusing range to be smaller than the entire focusing range, a period of driving of the focusing lens can be shortened, and the calculation speed can be further accelerated. The focus detection focusing range varies depending on the focus detection method. This is because a position of the focusing lens 104 at which highly reliable distance information can be calculated varies depending on the focus detection method. The focus detection focusing range also varies depending on moving object information acquired in step S204. Examples of setting of the focus detection focusing range will be described later using FIGS. 3A1 to 3C3.

As the focus detection focusing range can be set to be smaller than the entire focusing range as described above, a period required for the later-described focus detection processing can be further shortened.

In step S206, the camera MPU 125 determines whether the latest frame includes a predetermined moving object. The predetermined moving object denotes a moving object that satisfies the following conditions: the relative speed between the third latest frame and the second latest frame acquired in step S201 is higher than or equal to a predetermined speed, and a distance indicated by distance information in the second latest frame is smaller than or equal to a predetermined distance. The reason for making this moving object determination will be described later in step S207. Step S207 follows if it is determined that the predetermined moving object is included (YES of step S206), step S212 follows if it is determined that the predetermined moving object is not included (NO of step S206).

In step S207, the focus detection unit 129 included in the camera MPU 125 sets focus detection regions of the latest frame that include the predetermined moving object as highest-priority regions. Similarly to the focus detection execution regions, the highest-priority regions are set in the image 301, and indicate a range in which the focus detection unit 129 executes later-described focus detection (third focus detection regions). The highest-priority regions differ from the focus detection execution regions in range; the range of the highest-priority regions is always smaller than or equal to the range of the focus detection execution regions.

The highest-priority regions are set for the following reason. The present embodiment is based on the premise that the camera is mounted on a vehicle; thus, among objects that are approach the vehicle, an object that is at risk of collision with the vehicle needs to be given the highest priority in calculation of distance information. That is, in the present embodiment, the highest-priority regions are set to perform calculation of distance information therein as a highest priority at high speed, and distance information of moving objects in other regions is not calculated.

An object moving away from the vehicle has a low risk of collision with the vehicle, and thus the highest-priority regions need not be set therefor. On the other hand, an object approaching the vehicle has a high risk of collision with the vehicle, and the risk of collision increases as the approaching speed increases, that is, as the relative speed in the z-direction increases. However, as remote objects have a low chance of collision with the vehicle, the highest-priority regions need to be set in consideration of the positions of objects in addition to the relative speeds in the z-direction.

Although it will be assumed in the present embodiment that the predetermined speed and the predetermined distance used in setting the highest-priority regions are determined in advance, the predetermined distance may be determined in accordance with the predetermined speed. For example, 5 m can be set as the predetermined distance when an object speed is lower than 50 km/h, 10 m can be set as the predetermined distance when an object speed is higher than or equal to 50 km/h and lower than 80 km/h, and 15 m can be set as the predetermined distance when an object speed is higher than or equal to 80 km/h. These values are not restrictive; numerical values can be set depending on a situation. Conversely, the predetermined speed may be determined in accordance with the predetermined distance.

Returning to the description of FIG. 2, in step S208, the focus detection unit 129 included in the camera MPU 125 performs focus detection based on the DFD technique in the highest-priority regions set in step S207. This focus detection is performed in each one of the highest-priority regions set in step S207; thus, distance information of each individual object included in the highest-priority regions can be acquired.

In the focus detection based on the DFD technique, first, two images that differ from each other by a predetermined defocus amount are acquired by changing a position of the focusing lens, and blur evaluation values are calculated from the two images. As a period corresponding to several frames is required to move the position of the focusing lens in the acquisition of the two images, the two images are several frames apart from each other.

Note that images acquired for the purpose of focus detection are different from the aforementioned latest frame. Furthermore, at this time, the display unit 126 displays an image that immediately precedes the shifting of the focusing lens—i.e., the latest frame—in a static state, because a user need not view images that have been blurred by shifting the focusing lens. Thereafter, the acquired blur evaluation values are converted into defocus amounts with reference to the aforementioned blur evaluation value-defocus amount correlation, and distance information is acquired from the defocus amounts. It will be assumed that this correlation is stored in the RAM 125b as a table. The focus detection based on the DFD technique may specifically use a method described in Japanese Patent Laid-Open No. 2006-3803, or may use another method.

In focus detection performed in later-described step S212, a method that does not rely on the DFD technique may be used. For example, focus detection processing based on phase-difference detection on the imaging plane (hereinafter, "AF based on an imaging plane phase-difference method") may be executed. The principle of the AF based on the imaging plane phase-difference method is illustrated in, for example, FIGS. 2, 13, and 14 of Japanese Patent Laid-Open No. 2013-186201. In the imaging plane phase-difference method, the defocus amount is calculated based on the shift amount between correlated image signals of the object in the captured image, and distance information is acquired from the defocus amounts.

Furthermore, the focus detection performed in later-described step S212 may be, for example, focus detection processing based on a contrast method (hereinafter, "AF based on a contrast method"), which calculates a contrast evaluation value from luminance information that changes along with the shifting of the focusing lens.

In step S209, the distance information acquisition unit 132 included in the camera MPU 125 calculates pieces of distance information (information acquisition processing). Specifically, the pieces of distance information are calculated based on the results of focus detection acquired in the foregoing step S208 or later-described step S212, that is, defocus amounts. As the defocus amounts and the pieces of distance information (camera-object distances) are in one-to-one correspondence, the pieces of distance information can be calculated with reference to the relationships already stored in the RAM 125b.

In step S210, the distance map generation unit 134 included in the camera MPU 125 executes distance map update processing. The distance map update processing corresponds to processing for replacing a part or all of pieces of distance information in the distance map for the second latest frame stored in the RAM 125b with a new piece(s) of distance information, and storing the resultant map as a distance map for the latest frame to the RAM 125b. A specific example of the distance map update processing will be described later.

If no moving object has been detected, the distance map generation unit 134 included in the camera MPU 125 uses distance information similar to distance information of the second latest frame as distance information of the latest frame in step S211, and then ends the processes for updating the distance map (step S213). These steps are executed because there is no need to change distance information of the distance map if no moving object has been detected in step S202.

If no moving object satisfies the aforementioned conditions, that is, if none of the relative speeds in the z-direction is higher than or equal to the predetermined speed and none of the distances to the camera is smaller than or equal to the predetermined distance, the focus detection unit 129 included in the camera MPU 125 performs focus detection based on the DFD technique in each individual focus detection execution region in step S212. This focus detection is performed in each one of the focus detection execution regions set in step S204; thus, distance information of each individual object included in the focus detection execution regions can be acquired. The details of the focus detection method have already been described in relation to step S208.

In step S213, the camera MPU 125 ends the processes for updating the distance map. The processes for updating the distance map are executed, for example, between a time point in a shooting preparation state in which the shutter switch is pressed by half and full-pressing of the shutter switch, that is, the start of shooting processing; the execution of the processes for updating the distance map is repeated at a predetermined cycle. Therefore, the distance map for the latest frame becomes the distance map for the second latest frame upon completion of operations in one cycle, and the distance map for the second latest frame similarly becomes the distance map for the third latest frame upon completion of operations in one cycle.

<Setting of Focus Detection Execution Regions>

With reference to FIGS. 3A1 to 3C3, the following describes an example of setting of the focus detection execution regions by the focus detection unit 129 included in the camera MPU 125 in the present embodiment.

FIGS. 3A1, 3B1, 3C1, 3A2, 3B2, and 3C2 show examples of distance maps generated by the camera according to the present embodiment.

In FIG. 3A1, a11 to a15, a21 to a25, a31 to a35, and a41 to a45 compose an exemplary distance map for the third latest frame corresponding to an image a301 of the third latest frame.

Hereinafter, for ease of comprehension, the right side of a screen is defined as the positive side of the x-direction, and an upper side of the screen is defined as the positive side of the y-direction. Furthermore, it will be assumed that a point of intersection between an x-axis and a y-axis is a central position of the screen, and intersects the origin 0 of a z-axis.

Although the present embodiment describes an example in which an image is divided into five regions in the x-direction and four regions in the y-direction, hence twenty regions in total, no limitation is intended in this regard; the total number of the regions may be larger than or smaller than twenty. Dividing the image into a larger number of regions will improve the precision of distance information, but increases a calculation period; on the other hand, dividing the image into a smaller number of regions will shorten the calculation period, but reduces the fineness and precision of distance information. In view of this, the number of regions may be set as appropriate.

For the sake of explanation, FIG. 3A1 does not show objects present in the image a301 of the third latest frame, and FIG. 3A2 shows a specific example of a shot scene. A plurality of objects 302, 303, and 304 are present in the shot scene shown in FIG. 3A2. It will be assumed that focus detection regions in the image shown in FIG. 3A2 correspond to focus detection regions shown in FIG. 3A1, and are denoted by a11 to a15, a21 to a25, a31 to a35, and a41 to a45 similarly to FIG. 3A1. Each one of these twenty regions has distance information calculated by the distance information acquisition unit 132 and stored in the RAM 125b.

Similarly, in FIG. 3B1, b11 to b15, b21 to b25, b31 to b35, and b41 to b45 compose an exemplary distance map for the second latest frame corresponding to an image b301 of the second latest frame. Each one of focus detection regions b11 to b15, b21 to b25, b31 to b35, and b41 to b45 has distance information calculated by the distance information acquisition unit 132 and stored in the RAM 125b.

FIG. 3B2 shows a specific example of a shot scene associated with FIG. 3B1. The plurality of objects 302, 303, and 304 are present in the shot scene shown in FIG. 3B2. It will be assumed that these objects are the same as the objects shown in FIG. 3A1, and their positions move with the elapse of a period corresponding to one frame. It will also be assumed that focus detection regions shown in FIG. 3B2 correspond to the focus detection regions shown in FIG. 3B1, and are denoted by b11 to b15, b21 to b25, b31 to b35, and b41 to b45 similarly to FIG. 3B1.

Similarly, in FIG. 3C1, c11 to c15, c21 to c25, c31 to c35, and c41 to c45 compose an exemplary distance map for the latest frame corresponding to an image c301 of the latest frame. Note that distance information of this distance map is not calculated by the distance information acquisition unit 132 yet when focus detection execution regions are set. FIG. 3C2 shows a specific example of a shot scene associated with FIG. 3C1. The plurality of objects 302, 303, and 304 are present in the shot scene shown in FIG. 3C2. It will be assumed that these objects are the same as the objects shown in FIGS. 3A1 and 3B1, and their positions move with the elapse of a period corresponding to one frame. It will also be assumed that focus detection regions shown in FIG. 3C2 correspond to the focus detection regions shown in FIG. 3C1, and are denoted by c11 to c15, c21 to c25, c31 to c35, and c41 to c45 similarly to FIG. 3C1.

In FIG. 3B2, the object 302 is present within a range of the focus detection regions b21, b31, and b41 in the second latest frame; in FIG. 3C2, the object 302 is present within a range of the focus detection regions c21, c31, c41, c22, c32, and c42 in the latest frame. In FIG. 3B2, the object 303 is present within a range of b12, b13, b22, and b23 in the distance map for the second latest frame; in FIG. 3C2, the object 303 is present within a range of c12 and c13 in the latest frame. In FIG. 3B2, the object 304 is present within a range of b15 in the distance map for the second latest frame; in FIG. 3C2, the object 304 is present within a range of c15 and c25 in the latest frame. That is, among the focus detection regions of the second latest frame, hatched focus detection regions shown in FIG. 3B1 include moving objects, and among the focus detection regions of the latest frame, hatched focus detection regions shown in FIG. 3C1 include moving objects. Therefore, in the examples of FIGS. 3A1 to 3C3, the hatched regions shown in FIG. 3B1 or the hatched regions shown in FIG. 3C1 are set as the focus detection execution regions. That is, the focus detection regions c21, c31, c41, c12, c22, c32, c42, c13, c23, c15, and c25 shown in FIG. 3C1 are set as the focus detection execution regions.

<Determination of Focus Detection Focusing Range>

With reference to FIGS. 3A1 to 3C3, the following describes processing executed by the focusing range determination unit 133 included in the camera MPU 125 to determine the focus detection focusing range in the present embodiment.

FIGS. 3A3, 3B3, and 3C3 respectively show examples of distance information of moving objects included in the third latest frame, the second latest frame, and latest frame according to the present embodiment. The objects 302, 303, and 304 are the same as those shown in FIGS. 3A2, 3B2, and 3C2 described earlier. FIG. 3A3 corresponds to FIG. 3A2, and shows positional relationships among the objects 302, 303, and 304 in the z-direction. Similarly, FIG. 3B3 corresponds to FIG. 3B2, and FIG. 3C3 corresponds to FIG. 3C2. As stated earlier, it will be assumed that the position of the image sensor 122 is the origin 0 of the z-direction. FIGS. 3A3, 3B3, and 3C3 depict a state in which the camera is moving toward the positive side of the z-direction.

The focus detection focusing range varies depending on the status acquired by the moving object information acquisition unit 131. Examples of the focus detection focusing range will now be described using FIGS. 3A3, 3B3, and 3C3.

A first example pertains to a case in which only the object 303 is moving on a screen. In this example, it will be assumed that the objects 302 and 304 are not present on the screen. First, the moving object information acquisition unit 131 acquires a relative speed of the object 303 using distance information Za303 of the object 303 in the third latest frame and distance information Zb303 of the object 303 in the second latest frame. The acquired relative speed indicates whether the object 303 has moved toward or away from the origin 0 of the z-axis. In this example, as shown in FIGS. 3A3 and 3B3, a distance between the object 303 and the camera is larger in the second latest frame than in the third latest frame. In view of this, assuming that the object 303 will keep moving away from the camera in the latest frame as well, it is determined that the object 303 in the latest frame is closer to the positive side of the z-axis, that is, closer to the far end, than a position indicated by Zb303 is. Then, the focus detection focusing range is set such that it excludes a range that is closer to the near end than the position indicated by Zb303 is; this enables calculation of reliable focus detection results only with respect to objects that are farther from the camera than the position indicated by Zb303 is.

A second example pertains to a case in which only the objects 302 and 304 are moving on a screen. In this example, it will be assumed that the object 303 is not present on the screen. First, the moving object information acquisition unit 131 acquires a relative speed of the object 302 using distance information Za302 of the object 302 in the third latest frame and distance information Zb302 of the object 302 in the second latest frame. Similarly, it also acquires a relative speed of the object 304 using distance information Za304 of the object 304 in the third latest frame and distance information Zb304 of the object 304 in the second latest frame. The acquired relative speeds indicate whether the objects 302 and 304 have moved toward or away from the origin 0 of the z-axis. In this example, as shown in FIGS. 3A3 and 3B3, a distance between the object 302 and the camera and a distance between the object 304 and the camera are both smaller in the second latest frame than in the third latest frame. In view of this, assuming that the objects 302 and 304 will keep moving toward the camera in the latest frame as well, it is determined that the objects 302 and 304 in the latest frame are closer to the negative side of the z-axis, that is, closer to the near end, than positions indicated by Zb302 and Zb304 are, respectively. Then, the focus detection focusing range is set such that it excludes a range that is closer to the far end than the position indicated by Zb304 is; this enables calculation of reliable focus detection results only with respect to objects that are closer to the camera than the positions indicated by Zb302 and Zb304 are. Note that in this example, it is necessary to enable calculation of reliable focus detection results with respect to both of the objects 302 and 304; thus, in order to cover both of these objects, the calculation is performed with respect to objects that are closer to the camera than the position indicated by the distance information Zb304 is.

In the foregoing two examples, the calculation speed can be further accelerated as the set focus detection focusing range is smaller than the entire focusing range. Aside from these two examples, the calculation speed can be accelerated by setting the smallest possible focus detection focusing range whenever it is unnecessary to set the focus detection focusing range to be equal to the entire focusing range.

When a plurality of moving objects have been detected, the focus detection focusing range may be determined so that focus detection is performed with respect to the plurality of moving objects in ascending order of distances between the plurality of moving objects and the camera, starting from one or more moving objects that are approaching the camera.

As stated earlier, the focus detection focusing range varies depending on the focus detection method. This is because a position of the focusing lens 104 at which highly reliable distance information can be calculated varies depending on the focus detection method. A specific example will be described below.

For example, assume a case in which the object 302, which is closest to the near end among the objects present in the latest frame shown in FIG. 3C3, is in focus, whereas the object 304, which is closer to the positive side of the z-direction than the object 302 is, is out of focus and is in a blurred state. Although some focus detection methods can calculate high-precision distance information for such an object 304 present in the blurred state, some focus detection methods can only acquire low-reliability distance information therefor. In the latter case, the camera MPU 125 needs to change a defocus amount by a predetermined amount through the lens MPU 117, acquire an image showing the object 304 in better focus, and re-calculate distance information. It is sufficient for the camera MPU 125 to request the lens MPU 117 to change the defocus amount by an optimal value selected in accordance with a focus detection method used. That is, it is sufficient to select an optimal value for the focus detection focusing range in accordance with a focus detection method used.

<Setting of Highest-Priority Regions>

With reference to FIGS. 3A1 to 3C3, the following describes processing executed by the focus detection unit 129 included in the camera MPU 125 to set the highest-priority regions in the present embodiment.

As stated earlier, the hatched regions in FIG. 3B1 or 3C1 are set as the focus detection execution regions. Now, assume a case in which only the object 302 satisfies the following conditions among the objects 302, 303, and 304 shown in FIG. 3B2: the relative speed in the z-direction is higher than or equal to the predetermined speed, and the distance is smaller than or equal to the predetermined distance. In this case, the focus detection regions b21, b31, and b41 in the second latest frame that include the object 302, or the focus detection regions b21, b31, b41, c21, c31, and c41 in the latest frame that include the object 302, are set as the highest-priority regions. That is, a total of six focus detection regions b21, b31, b41, c21, c31, and c41 are set as the highest-priority regions. Both of the second latest frame and the latest frame are taken into consideration because, as stated earlier, it is necessary to set focus detection execution regions that cover both of the second latest frame showing the origin of the movement of the moving object and the latest frame showing the destination of the movement of the moving object. Then, the focus detection unit 129 performs focus detection in the six focus detection execution regions associated with the object 302, the distance information acquisition unit 132 performs calculation with respect to the results of the focus detection, and the distance map generation unit 134 executes the update processing based on the results of the calculation. Using distance information acquired by the distance information acquisition unit 132, the distance map generation unit 134 replaces only a corresponding part of the distance map for the second latest frame stored in the RAM 125b with the acquired distance information, and stores the resultant distance map as the distance map for the latest frame to the RAM 125b.

As described above, in updating a distance map, the present embodiment makes it possible to acquire, at higher speed, a distance to an object that approaches the camera at a speed higher than or equal to the predetermined speed and that is away from the camera by a distance smaller than or equal to the predetermined distance.

In the present embodiment, a distance map is generated by calculating a predetermined number of pieces of distance information based on the same predetermined number of focus detection results that have been acquired by executing the focus detection processing in each one of the same predetermined number of focus detection regions; however, the number of focus detection results need not match the number of pieces of distance information. For example, in a case where the number of focus detection results is large, the number of pieces of distance information may be smaller than the number of focus detection results; in this case, the number of pieces of distance information may be reduced by performing weighted addition of focus detection results.

Focus detection need not be executed in the entirety of the focus detection execution regions, and may be executed only with respect to an object partially extracted from the focus detection execution regions. For example, referring to FIG. 3B2, among the focus detection regions b21, b31, and b41 including the object 302, an area that includes only the object 302 may be the target of the execution of focus detection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110217, filed Jun. 1, 2016 which is hereby incorporated by reference herein in its entirety.

What is claimed is:

1. An image capturing apparatus comprising:
an image capturing unit;
one or more processors and/or one or more circuits, the one or more processors and/or one or more circuits being configured to act as units comprising:
(1) a moving object detection unit configured to detect, among objects using an image acquired by the image capturing unit, moving objects moving relative to the image capturing apparatus;
(2) a depth information detection unit configured to set a plurality of first detection regions in the image acquired by the image capturing unit, and to detect a plurality of depth information respectively corresponding to the plurality of first detection regions;
(3) a storage control unit configured to store the plurality of depth information as map data in a storage unit; and
(4) a moving object information acquisition unit configured to acquire moving object information based on the map data, the moving object information indicating relative positional relationships between (a) the moving objects detected by the moving object detection unit and (b) the image capturing apparatus,
wherein the depth information detection unit detects a second depth information in a second detection region including at least one of regions in which the moving object is detected based on the result of the moving object detection by the moving object detection unit,
wherein the storage control unit updates the second depth information detected by the depth information detection unit with respect to the map data stored in the storage unit, and
wherein when the moving object detection unit has detected a predetermined moving object among the one or more of the moving objects included in the second detection region, the depth information detection unit sets third detection regions that include the predetermined moving object and performs depth information detection in the third detection regions, the predetermined moving object being an object approaching the image capturing apparatus at a speed higher than or equal to a predetermined speed and being away from the image capturing apparatus by a distance smaller than or equal to a predetermined distance.

2. The apparatus according to claim 1, wherein the set third detection regions cover both of (a) detection regions set in a latest frame showing destinations of movements of the moving objects and (b) detection regions set in a second latest frame showing origins of the movements of the moving objects.

3. The apparatus according to claim 1, wherein the moving object detection unit detects the object which temporally changes in positions and sizes of the objects as the moving object among the objects in the image, and
wherein the moving object information acquisition unit acquires a distance between (a) a moving object detected by the moving object detection unit and (b) the image capturing apparatus, and a speed of the detected moving object relative to the image capturing apparatus.

4. The apparatus according to claim 3, further comprising (1) an optical system configured to form an optical image of an object onto the image capturing unit and (2) a determination unit provided by the one or more processors and/or one or more circuits and being configured to determine, based on the distance and the speed included in the moving object information acquired by the moving object information acquisition unit, a moving range for the optical system to perform depth information detection by the depth information detection unit,
wherein when the detected moving object moves away from the image capturing apparatus, the moving range determined by the determination unit excludes a range that is closer to a near end than the detected moving object is, and
wherein when the detected moving object is the predetermined moving object, the moving range determined by the determination unit excludes a range that is closer to a far end than the detected moving object is.

5. The apparatus according to claim 4, wherein when the number of the detected moving object is more than one, the determination unit determines the moving range so that depth information detection is performed with respect to the detected moving objects in ascending order of distances between the detected moving objects and the image capturing apparatus, starting from one or more moving objects that are approaching the image capturing apparatus.

6. The apparatus according to claim 4, wherein the optical system includes a focusing lens, and
wherein the depth information detection unit performs depth information detection by driving the focusing lens in the moving range determined by the determination unit.

7. The apparatus according to claim 3, wherein the moving range varies depending on a detection method used by the depth information detection unit.

8. The apparatus according to claim 7, wherein the depth information is calculated based on a defocus amount acquired from a shift amount between correlated image signals of the object in the image when the detection method is a first detection method, and the depth information is calculated based on a defocus amount acquired from a correlation with an evaluation value of a blur amount of the object in the image when the detection method is a second detection method.

9. The apparatus according to claim 3, wherein the moving object detection unit detects the moving objects based on changes in positions and sizes of the objects between an image of a latest frame and an image of a second latest frame that are stored in the storage unit.

10. The apparatus according to claim 1, wherein the moving object detection unit detects the moving objects based on results of detection by a gyroscope that detects movements of the image capturing apparatus.

11. The apparatus according to claim 1, wherein the image is an image captured by a pupil-divided-type image sensor.

12. A control method of an image capturing apparatus which includes (1) an image capturing unit, and (2) one or more processors and/or one or more circuits, the one or more processors and/or one or more circuits being configured to act as units comprising (a) a moving object detection unit configured to detect, among objects using an image acquired by the image capturing unit, moving objects moving relative to the image capturing apparatus, (b) a depth information detection unit configured to set a plurality of first detection regions in the image acquired by the image capturing unit, and to detect a plurality of depth information respectively corresponding to the plurality of first detection regions, and (c) a storage control unit configured to store the plurality of depth information as map data in a storage unit, the method comprising:

acquiring moving object information based on the map data, the moving object information indicating relative positional relationships between (a) the moving objects detected by the moving object detection unit and (b) the image capturing apparatus;

detecting a second depth information in a second detection region including at least one of regions in which the moving object is detected based on the result of the moving object detection by the moving object detection unit; and updating the second depth information detected by the depth information detection unit with respect to the map data stored in the storage unit, wherein when the moving object detection unit has detected a predetermined moving object among the one or more of the moving objects included in the second detection region, the depth information detection unit sets third detection regions that include the predetermined moving object and performs depth information detection in the third detection regions, the predetermined moving object being an object approaching the image capturing apparatus at a speed higher than or equal to a predetermined speed and being away from the image capturing apparatus by a distance smaller than or equal to a predetermined distance.

13. A non-transitory computer-readable storage medium storing a program for causing a computer to execute a control method of an image capturing apparatus which includes an image capturing unit, and (2) one or more processors and/or one or more circuits, the one or more processors and/or one or more circuits being configured to act as units comprising (a) a moving object detection unit configured to detect, among objects using an image acquired by the image capturing unit, moving objects moving relative to the image capturing apparatus, (b) a depth information detection unit configured to set a plurality of first detection regions in the image acquired by the image capturing unit, and to detect a plurality of depth information respectively corresponding to the plurality of first detection regions, and (c) a storage control unit configured to store the plurality of depth information as map data in a storage unit, the method comprising:

acquiring moving object information based on the map data, the moving object information indicating relative positional relationships between (a) the moving objects detected by the moving object detection unit (b) and the image capturing apparatus;

detecting a second depth information in a second detection region including at least one of regions in which the moving object is detected based on the result of the moving object detection by the moving object detection unit; and updating the second depth information detected by the depth information detection unit with respect to the map data stored in the storage unit, wherein when the moving object detection unit has detected a predetermined moving object among the one or more of the moving objects included in the second detection region, the depth information detection unit sets third detection regions that include the predetermined moving object and performs depth information detection in the third detection regions, the predetermined moving object being an object approaching the image capturing apparatus at a speed higher than or equal to a predetermined speed and being away from the image capturing apparatus by a distance smaller than or equal to a predetermined distance.

* * * * *